United States Patent Office 2,947,020
Patented Aug. 2, 1960

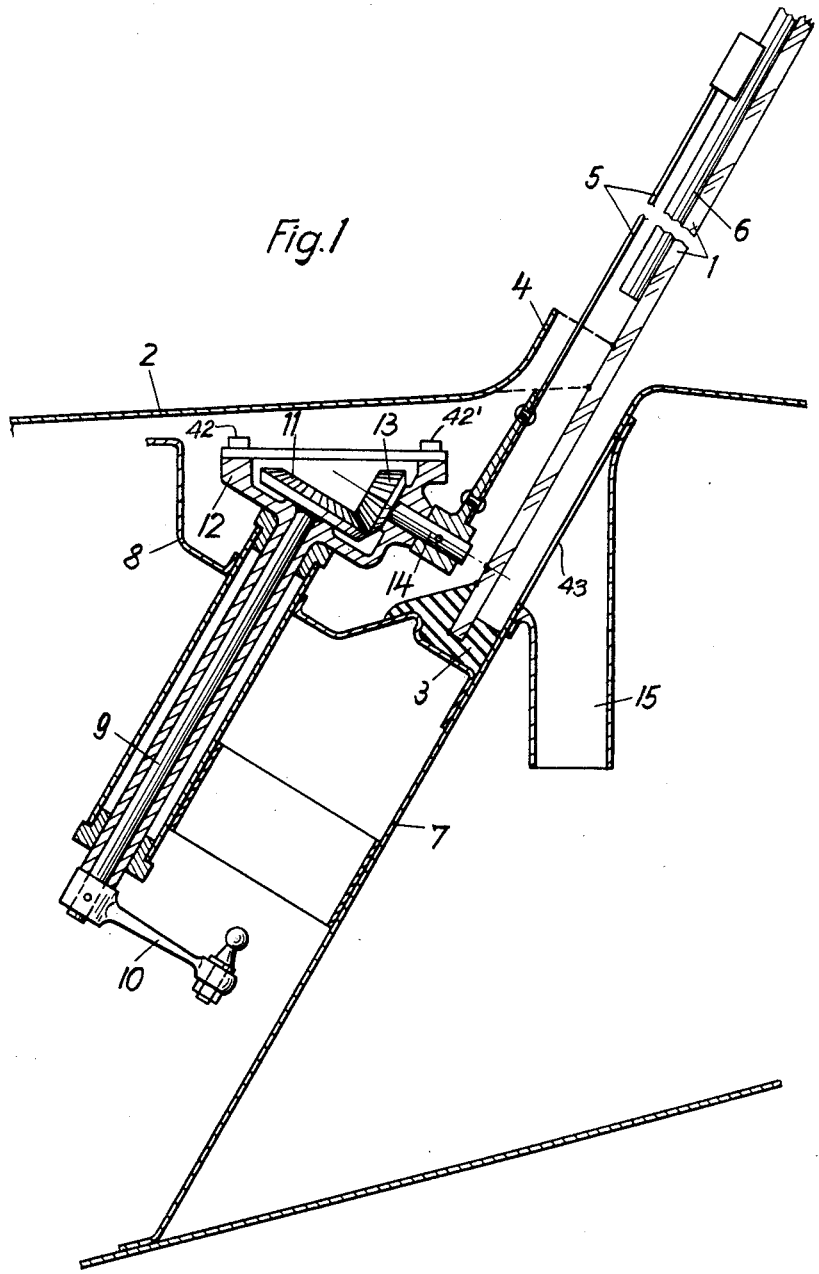

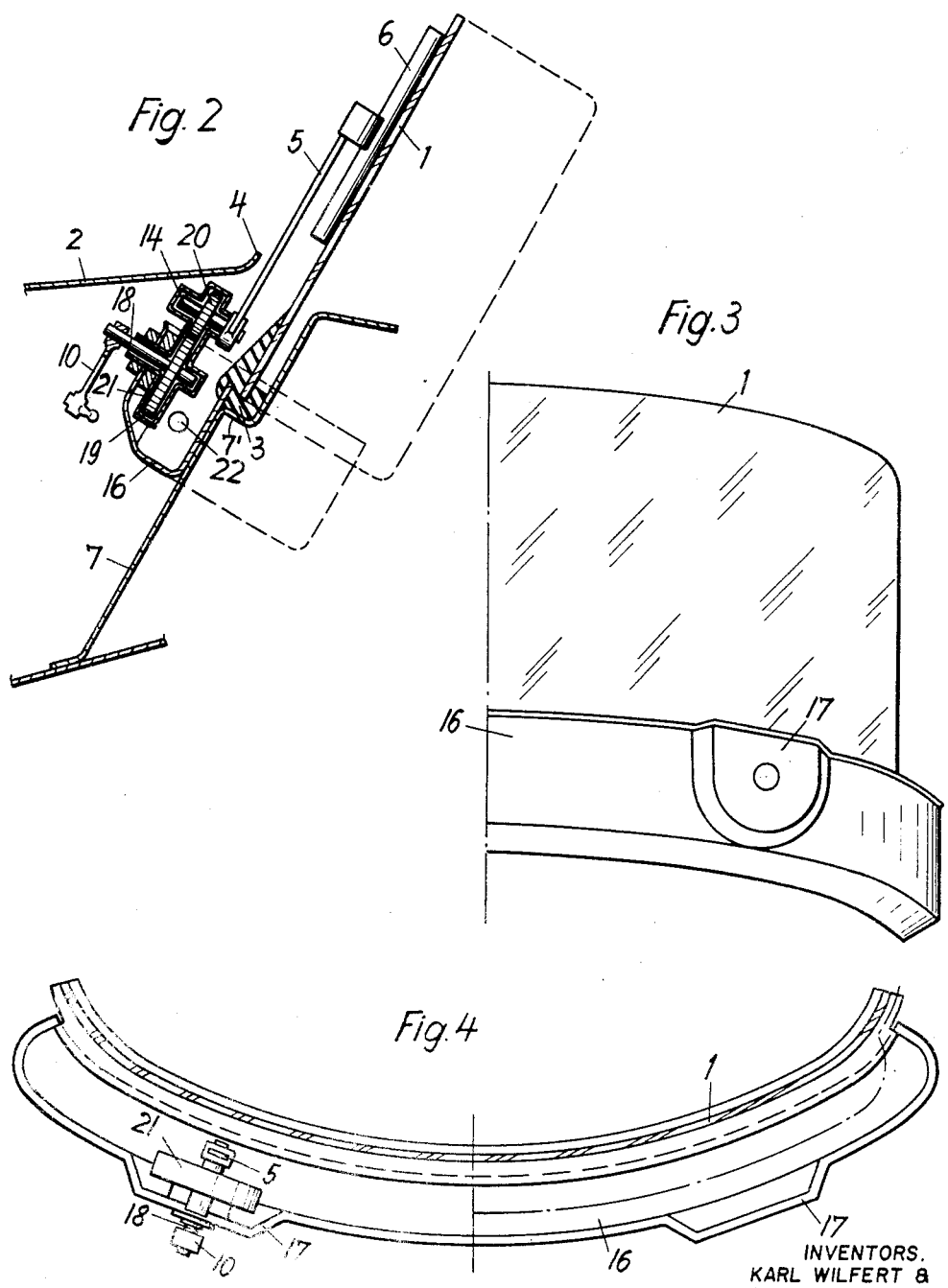

2,947,020

WINDSHIELD WIPER ARRANGEMENT FOR MOTOR VEHICLES

Karl Wilfert, Stuttgart-Degerloch, and Bela Barenyi, Stuttgart-Rohr, Germany, assignors to Daimler-Benz Aktiengesellschaft, Stuttgart-Unterturkheim, Germany Filed Dec. 21, 1953, Ser. No. 399,358

Claims priority, application Germany Dec. 22, 1952

9 Claims. (Cl. 15—250.16)

The present invention relates to a windshield wiper arrangement for motor vehicles, and more particularly for motor vehicles having a curved windshield. The present invention consists essentially in that the axis of rotation of the wiper arm lies underneath the hood or cowl of the front section of the motor vehicle and is movable in a gap between the windshield and the front section of the vehicle such as the hood or the cowl.

It is, accordingly, an object of the present invention to provide a windshield wiper arrangement which may be actuated in a suitable and reliable manner in such a way that the driving mechanism does not reduce the field of vision of the driver.

It is a further object of the present invention to provide a windshield wiper which follows closely the outer contour of the windshield, which may be of the curved windshield type.

It is a still further object of the present invention to provide a windshield wiper which disappears completely from the field of vision in the normal rest position thereof.

A still further object of the present invention resides in the provision of a windshield wiper which rotates to and fro over substantially an angle of 180 degrees.

It is another object of the present invention to provide a windshield wiper arrangement which permits the use of a plurality of windshield wipers placed alongside one another with the effective range of operation of adjacent windshield wipers overlapping.

It is a still further object of the present invention to provide a mechanical drive by means of gears for a windsheld wiper arrangement which may be driven from a motor by means of a crank.

A still further object of the present invention is the provision of a windshield wiper drive mechanism which is arranged in a gutter-like channel between the windshield and the front part of the vehicle, located below the upper surface of such front part, which includes a drainage for water which may accumulate in the gutter-like channel, and which further includes a heating equipment, preferably connected with the heating system of the vehicle to assure quick melting of the snow which may be pushed into the gutter-like channel during the operation of the windshield wiper arms.

Further objects and advantages of the present invention will become more obvious from the following description when taken in connection with the accompanying drawing, which shows for purposes of illustration only several preferred embodiments of the present invention, and wherein:

Figure 1 is a cross sectional view of one embodiment of a windshield wiper arrangement in accordance with the present invention.

Figure 2 is a cross sectional view of another embodiment of a windshield wiper arrangement in accordance with the present invention.

Figure 3 is a front view of the windshield wiper arrangement of Figure 2 with the body of the front part of the vehicle removed, and Figure 4 is a top view of the windshield wiper arrangement of Figure 2.

The present invention has the advantage that the windshield wiper arm may be driven in any suitable manner, and that the driving mechanism does not adversely affect the field of vision of the driver. Such arrangement also offers the advantage that the movement of the windshield wiper may be closely fitted to the contour of the windshield.

The windshield wiper arrangement in accordance with the present invention may be advantageously formed in such manner that the lower edge of the windshield lies below the body of the front section of the vehicle, as, for example, below the cowl or hood, and that the axis of rotation of the wiper arm lies in the region of this edge.

In connection therewith, the windshield wiper arrangement may be advantageously made in such manner that the projection of the axis of rotation of the wiper arm on the windshield lies, on the one hand, within the region of the lower transverse leg of the windshield moulding or rim, and, on the other hand, lies between the lower edge of the windshield and the intersection thereof with the extension of the upper surface of the hood or cowl, a gap being formed between the windshield and such upper surface.

The windshield wiper arm can preferably completely disappear in its normal rest position from the field of vision of the driver by making the windshield wiper arm oscillatable over an angle of approximately 180 degrees. The gap for the windshield wiper arm may preferably be formed by bending upwardly the edge of the hood or cowl, which is opposite the windshield, in a smoothly curved manner.

An improved field of vision may also be obtained in accordance with the present invention by arranging a plurality of windshield wipers adjacent one another in such a manner that the surfaces which are wiped by the respective wiper blades overlap partially with one another.

The drive of the windshield wiper in accordance with the present invention may include a gear mechanism including spur gears or bevel gears. Furthermore, the windshield wiper of the present invention may be advantageously driven by a motor of the vehicle, wherein the gearing arrangement is connected with such motor by means of a crank which is mounted on the driving shaft of the gearing arrangement.

The windshield wiper arrangement may, for example, be fastened to the vehicle by providing a bracket-like member which supports the driving mechanism of the windshield wiper. Such bracket member may be fastened to an inner wall which forms approximately an extension of the windshield.

A plurality of windshield wipers may be provided in accordance with the present invention in a particularly advantageous spatial manner by providing a gutter-like channel along the lower edge of the windshield, such gutter-like channel may preferably be made of sheet metal, and by providing therein two windshield wiper arrangements with an appropriate driving mechanism.

The gutter-like channel may include a drain and a heating device, such as, for example, a pipe connected with the water cooling system of the vehicle, so that during snowfall the snow which is wiped by the blades into such channel member may be made to melt as quickly as possible.

Referring now to the drawing wherein like reference numerals are used throughout the various views to designate like parts, and more particularly to Figure 1, reference numeral 1 designates the transparent windshield pane. The windshield pane 1 is preferably of the curved windshield type, and extends with its lower edge considerably below the upper surface 2 of the front part of the vehicle, such as the hood or cowl thereof. The lower edge of the windshield pane 1 is provided with a moulding or rim 3. A gap is formed between the windshield pane 1 and the hood 2, while the edge 4 of hood 2, which is juxtaposed windshield pane 1, is bent upwardly in a curved, convex-like manner. The wiper arm 5 of a windshield wiper including a wiper blade 6 is positioned in such gap.

A bracket-like channel member 8 which may be made of any suitable material, such as sheet metal, is affixed to the inner wall 7 in any suitable manner as by welding, riveting or bolting. The inner wall 7, which may at the same time form the fire wall of the vehicle, lies in a plane substantially parallel with the plane of the windshield pane 1. The bracket-like channel member 8 is fastened to inner wall 7 at such point that the lower transverse leg 3 of the windshield moulding rests thereon. The moulding 3, which may be made of any suitable elastic material, such as rubber, may be formed with a slanting surface on the outer side of the windshield pane 1 so as to provide for proper drainage of the water due to rain or the like which drains downwardly along the windshield.

A shaft 9 is suitably journalled in channel member 8 in any suitable manner, and may include appropriate bearings. A crank lever or arm 10 is securely fastened to the lower end of shaft 9. Crank lever 10 may include a journal or ball joint which engages a corresponding suitable rotating element of a motor to translate the rotating motion of the motor into oscillating motion of shaft 9. Shaft 9 is provided at its upper end with a bevel gear 11, which meshes with another bevel gear 13 attached to the rotating axle 14, which is suitably journalled and supported in housing 12. The gearing arrangement is covered by means of a cover 41 which is removably fastened to housing 2 in any suitable manner, as by bolts 42 and 42'.

The windshield wiper arm 5 is mounted on axle 14, so that axle 14 also forms the axis of rotation for the windshield wiper arm 5. The inner wall 7 is provided along the inner side of windshield pane 1 with openings 43. Connecting members 15 for connection with the hot air heating system of the vehicle communicate with openings 43.

It is noted that the axis of rotation of axle 14 is substantially perpendicular to the windshield pane 1 and its projection on windshield pane 1 is within the lower region of the windshield between the moulding 3 and the intersection of a straight extension of the upper surface of the hood 2 with the windshield.

In the further embodiment of the windshield wiper arrangement in accordance with the present invention, illustrated in Figures 2 to 4, the inner wall 7 is provided with a leg portion 7' which serves as support for the lower transverse moulding 3 of the windshield pane 1. A gutter-like channel member 16, which is made of any suitable material, preferably of sheet metal, is affixed to inner wall 7 in any suitable manner as by welding, riveting or bolting. As clearly shown in Figure 2 the transverse moulding 3 extends forwardly beyond the edge of channel member 16 which itself projects beyond the leg 7' in a direction parallel with inner wall 7. A shaft 18 is suitably journalled in the widened portion 17 of gutter-like channel member 16. A crank lever 10 provided with a ball pin is again fastened to one end of shaft 18, while a spur gear 19 is suitably fixed to the other end thereof. Spur gear 19 meshes with another spur gear 20 which is supported on rotating axle 14 of windshield wiper arm 5 for rotation therewith. The shafts 18 and 14 and the gears 19 and 20 are surrounded by a common housing 21. A heating device 22 is provided over the floor of the gutter-like channel member 16 such heating device being, for example, a pipe which may be connected to the water cooling system of the motor vehicle. The pipe 22 may be bent in a manner corresponding to the channel member 16. Again, this heating system serves to accelerate melting of the snow which is pushed by blade 6 into the channel member 16. An outlet (not illustrated) may be provided at the lowest point of the channel member 16 to provide for drainage of the water which may accumulate therein.

In both preferred embodiments of the present invention the wiper arm is preferably driven by an electric motor which is suitably connected by an appropriate connecting shaft or the like with the ball pin of the crank lever 10 whereby the rotating motion of the motor is transformed into oscillating motion of the shafts 9 and 18, which oscillating motion is transmitted by means of gears 11 and 13 or gears 19 and 20 to the shafts 14 so that the windshield wiper arm 5 together with the blade passes through approximately an angle of 180 degrees in its movement, and comes to lie below the edge 4 of the hood 2 in its normal rest position.

As is visible from Figure 4 of the drawing, ordinarily two windshield wiper arrangements are provided along the windshield. The respective driving mechanism of the two windshield wiper arrangements may be connected with one another.

In particularly wide motor vehicles, it is also possible to provide more than two windshield wiper arrangements, while the surfaces wiped by the blades of adjacent windshield wiper arrangements may again overlap partially.

We claim:

1. A wiper arrangement for motor vehicles having a cowl forming part of the front section of the vehicle said cowl having a transversely extending substantially horizontal upper wall portion, and a transversely extending window pane having a lower edge disposed beneath said upper wall portion, said cowl also having a terminal portion in front of said window pane and spaced therefrom to provide a gap, said wiper arrangement comprising wiper means adapted for oscillatory movement in said gap along said window pane, said wiper means having a horizontal rest position beneath said upper wall portion, an oscillatory shaft, said wiper means being mounted upon said oscillatory shaft for oscillatory movement along a path spaced from said terminal portion, drive means for oscillating said shaft and for pivoting said wiper means to said rest position, and said shaft being disposed beneath said upper wall portion.

2. A wiper arrangement according to claim 1, wherein said drive means drives said wiper means to and fro over approximately 180 degrees, said windshield wiper means disappearing from the field of vision of the driver in said normal rest position.

3. A wiper arrangement according to claim 1, further comprising an elastic moulding surrounding said lower edge, and wherein the projection of the axis of said shaft intersects said window pane between said moulding and the intersection of an extension of said upper part with said window pane.

4. A wiper arrangement according to claim 3, wherein said terminal portion extends upwardly along its edge opposite said window pane so as to form along said edge a wall portion extending substantially parallel to the surface of said windshield.

5. A wiper arrangement for motor vehicles according to claim 1, wherein the axis of said shaft projects on said window pane below said cowl.

6. A wiper arrangement according to claim 5, wherein said axis is perpendicular to the plane of said window pane at the point of intersection therewith.

7. A wiper arrangement according to claim 5, wherein said drive means for oscillating said shaft and for pivoting said wiper means to said rest position includes a plurality of meshing gears.

8. A wiper arrangement for motor vehicles according to claim 1, an inner wall proceeding substantially parallel to and below said window pane, a channel member fastened to said inner wall and defining the lower limit of said gap.

9. A wiper arrangement according to claim 8 including drain means in said channel member and heating means connected with the cooling water system of the vehicle motor located in said channel member.

References Cited in the file of this patent

UNITED STATES PATENTS

| | | |
|---|---|---|
| 1,719,444 | Oishei | July 2, 1929 |
| 1,869,551 | Earl | Aug. 2, 1932 |
| 2,006,323 | Horton | June 25, 1935 |
| 2,046,171 | Lauer | June 30, 1936 |
| 2,206,822 | Rousseau | July 2, 1940 |
| 2,271,225 | Heffernan | Jan. 27, 1942 |
| 2,634,447 | Domek et al. | Apr. 14, 1953 |

FOREIGN PATENTS

| | | |
|---|---|---|
| 499,062 | Great Britain | Jan. 18, 1939 |
| 675,432 | Great Britain | July 9, 1952 |